US008577895B2

(12) United States Patent
Gupta et al.

(10) Patent No.: US 8,577,895 B2
(45) Date of Patent: Nov. 5, 2013

(54) DYNAMIC CONTACTS LIST MANAGEMENT

(75) Inventors: Amit Gupta, Bellevue, WA (US);
Amritansh Raghav, Seattle, WA (US);
Cindy Kwan, Bellevue, WA (US);
Dejun Zhou, Seattle, WA (US); Rui Liang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 12/727,959

(22) Filed: Mar. 19, 2010

(65) Prior Publication Data

US 2011/0231407 A1 Sep. 22, 2011

(51) Int. Cl.
*G06F 17/30* (2006.01)
(52) U.S. Cl.
USPC .......................... 707/748; 707/804; 707/752
(58) Field of Classification Search
None
See application file for complete search history.

(56) References Cited

U.S. PATENT DOCUMENTS

| 7,418,663 | B2 * | 8/2008 | Pettinati et al. ............... 715/739 |
| 7,583,671 | B2 * | 9/2009 | Ramani et al. ............... 370/392 |
| 2005/0198172 | A1 | 9/2005 | Appelman et al. |
| 2007/0067392 | A1 * | 3/2007 | Torres et al. ................... 709/206 |
| 2007/0198281 | A1 * | 8/2007 | Abernethy et al. ............... 705/1 |
| 2008/0133580 | A1 | 6/2008 | Wanless et al. |
| 2008/0147639 | A1 * | 6/2008 | Hartman et al. .................. 707/5 |
| 2008/0253544 | A1 | 10/2008 | Brown et al. |
| 2008/0263076 | A1 | 10/2008 | Duffield et al. |
| 2009/0089806 | A1 | 4/2009 | Mayer |
| 2009/0104895 | A1 | 4/2009 | Kasturi et al. |
| 2009/0186597 | A1 | 7/2009 | Lin et al. |
| 2009/0274286 | A1 | 11/2009 | O'Shaughnessy et al. |
| 2009/0292785 | A1 | 11/2009 | Leedberg et al. |
| 2010/0082693 | A1 * | 4/2010 | Hugg et al. ................... 707/798 |
| 2010/0330972 | A1 * | 12/2010 | Angiolillo ..................... 455/418 |

FOREIGN PATENT DOCUMENTS

KR        1020090068819 A        6/2009

OTHER PUBLICATIONS

Whittaker, et al., "Contact Management: Identifying Contacts to Support Long-Term Communication", Retrieved at <<http://dis.shef.ac.uk/stevewhittaker/ContactManagement-CSCW02.pdf>> CSCW'02, Nov. 16-20, 2002, pp. 11.
Hallberg, et al., "Creating Dynamic Groups Using Context-Awareness", Retrieved at <<http://media.csee.ltu.se/projects/MobiGroup/papers/Creating%20Dynamic%20Groups%20using%20Context-awareness.pdf>> Dec. 12-14, 2007, pp. 42-49.
"International Search Report", Mailed Date: Nov. 15, 2011, Application No. PCT/US2011/028515, Filed Date: Mar. 15, 2011, pp. 9.

* cited by examiner

*Primary Examiner* — Yuk Ting Choi
(74) *Attorney, Agent, or Firm* — Turk IP Law, LLC

(57) ABSTRACT

Contacts lists are dynamically managed in association with communication and collaboration applications and devices. Automated and user defined factors are determined based on information from various resources such as user profile, contact information, past communication information, application/device types, and comparable ones. Factors may be weighted and employed to prioritize contacts lists under different circumstances. Prioritized contacts lists may be provided to a user, stored, updated, or otherwise processed.

19 Claims, 8 Drawing Sheets

DYNAMIC CONTACTS LIST MANAGEMENT

BACKGROUND

Modern communication systems that can provide a large number of capabilities including integration of various communication modalities with different services enable a wider array of communication between people. Social networking applications, multimodal enterprise communication applications, and comparable ones are examples of rapidly proliferating communication systems taking advantage of the modern capabilities.

Many communication applications or service (e.g. instant messaging, Voice over IP "VOIP" applications, and the like) employ a mechanism to maintain contacts. Such mechanisms are typically managed manually by the end user and difficult, if possible, to transfer or maintain over different services. Users may spend significant amount of time managing these contacts and deal with complicated long lists of contacts which may or may not be used frequently. As communication systems evolve and multi-modal, real-time or non-real-time communications become prevalent, management of contact information across various applications/services becomes an increasingly challenging task.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a dynamically managed contacts list in association with communication and collaboration applications and devices. Automated and user defined factors for prioritizing contacts lists may be determined based on information from various resources such as user profile, contact information, past communication information, application/device types, and comparable ones. Factors may be weighted and employed to prioritize contacts lists under different circumstances. According to some embodiments, prioritized contacts lists may be provided to a user, stored, or otherwise processed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
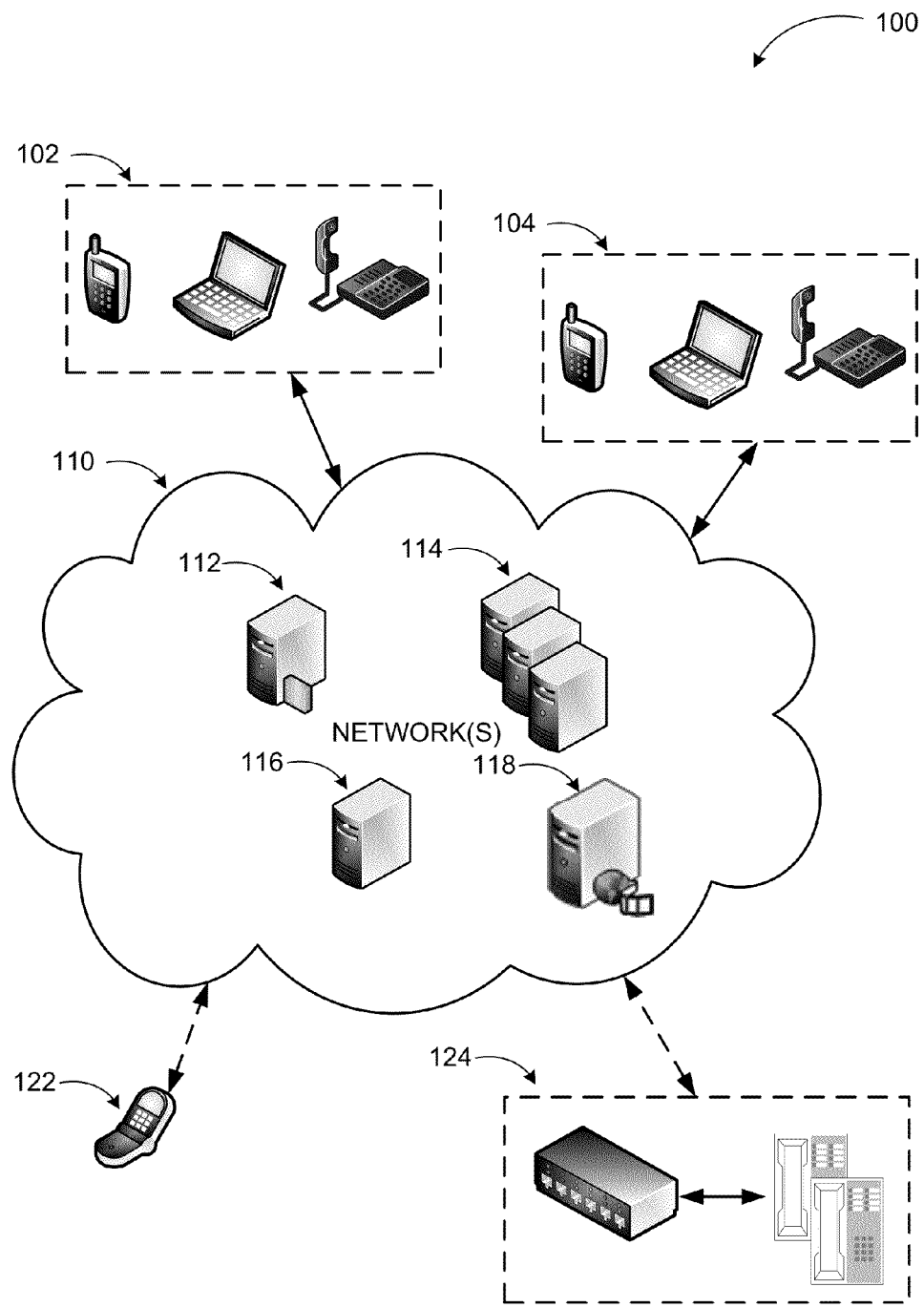
FIG. 1 is a diagram illustrating an example unified communications system, where embodiments may be implemented for pre-populating contacts lists.

As briefly described above, contacts lists may be managed dynamically and prioritized contact information provided to users based on information from different resources and weighting factors. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "dynamic" as used in conjunction with maintenance of contacts lists is intended to illustrate the distinction between conventional approaches, where statically stored and managed information is used with rigid rules, and embodiments, which enable creation and updating of contacts information based on frequently changing parameters such as subscriber presence, user device(s), conversation types, and similar ones.

FIG. 1 includes diagram 100 illustrating an example unified communications system, where embodiments may be implemented for dynamically managing contacts lists. A unified communication system is an example of modern communication systems with a wide range of capabilities and services that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for social networking, multimodal enterprise communications, and similar environments. When a subscriber participated in such an environment, they develop contacts list(s) as part of taking advantage of the capabilities of their enhanced communication application(s). In a system according to embodiments, the contacts lists for different applications may be dynamically managed in association with various communication and collaboration applications and devices and prioritized based on weighted factors such as type and frequency of communication between the subscriber and the contacts, application/device types and capabilities, time of day, day of week, explicitly defined relationships, and similar parameters. More detailed examples are discussed below.

While the example system in FIG. 1 has been described with specific components such as mediation server, A/V server, and similar devices, embodiments are not limited to these components or system configurations and can be implemented with other system configuration employing fewer or additional components. Functionality of systems dynamically managing contacts lists based on a variety of sources and weighting factors may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
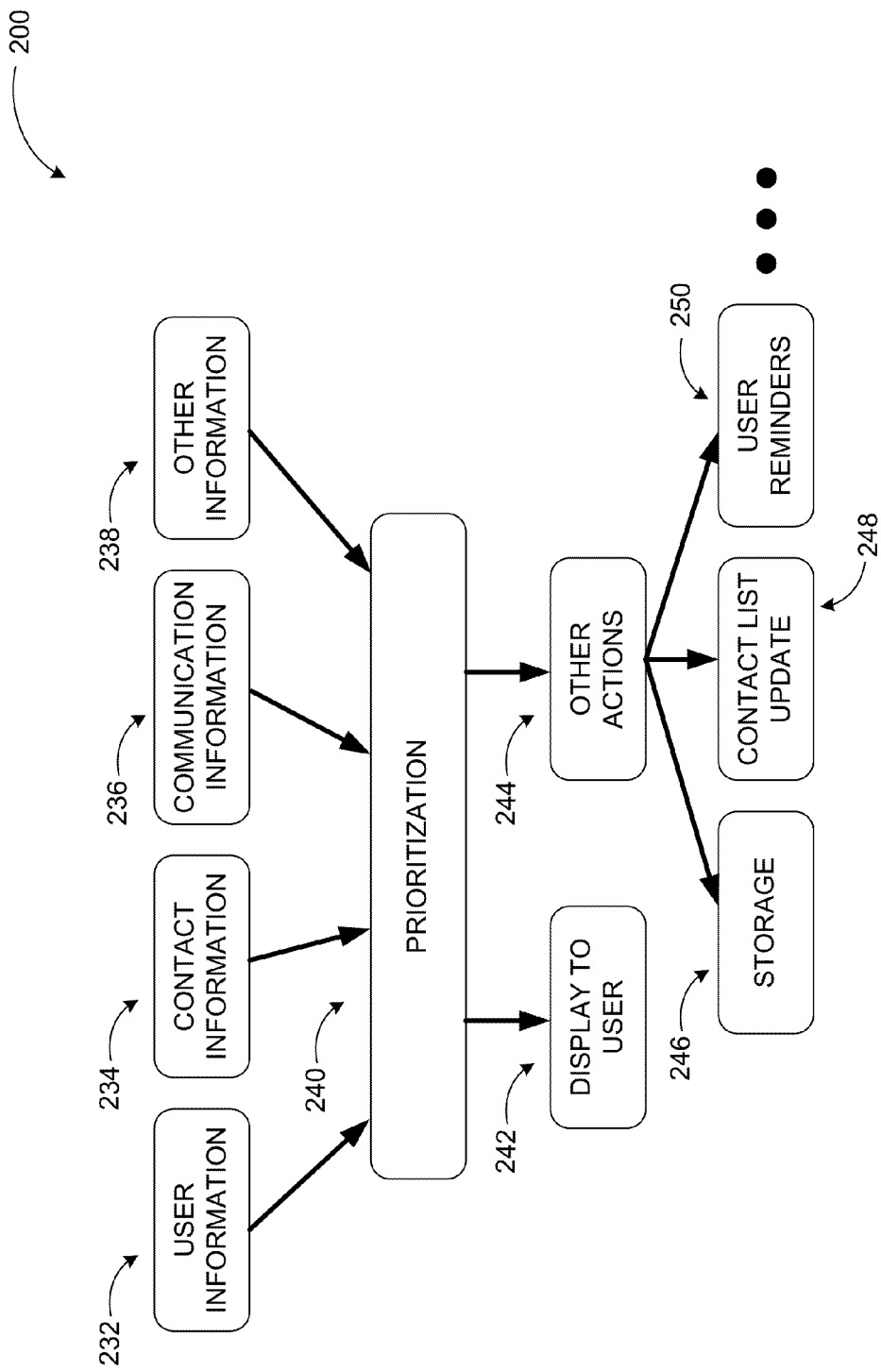
FIG. 2 is a block diagram illustrating components and resources in dynamic management of contacts lists.

FIG. 2 is a block diagram illustrating components and resources in dynamic management of contacts lists. As mentioned above, a system according to embodiments may manage a user's contacts list(s) dynamically based on weighted factors computed from a variety of sources. Some of the information used in determining priorities may include frequency of communication/collaboration, type of communication, time of day, day of week, explicitly defined relationships and similar user preferences.

The various types of information that may be used in prioritizing contacts lists are shown in four categories in diagram 200. User information 232 may include any information associated with the user's profile. Examples of user information 232 may include relationships explicitly defined by the user (e.g. manager, team members, etc.), user application/device capabilities (e.g. modality of conversation), user location (e.g. home, work, public place), current time of day and/or day of week for the user, and explicit user preferences.

Contact information 234 refers to information associated with specific contacts in the contacts list such as relationships explicitly defined by the contacts, contact application/device capabilities, contact location, current time of day and/or day of week for the contact, and comparable ones. Communication information 236 covers information associated with past conversations with individual contacts. These may include frequency of communication, time of communication, length of communication, modality of communication (e.g. audio, video, email, instant message, data collaboration, application sharing, whiteboard sharing, multimodal conversation, multimodal conference, etc.), number of people involved in the communication, whether the communication was initiated by the user of by the contact (or by a third party), and similar ones. Other information 238 may include any remaining relevant information sources such as network conditions, admin rules, and the like.

The information discussed above may be used to compute weighted factors for prioritization (240) of the contacts lists. Following are several example scenarios. The factors for prioritizing a contacts list may be weighted based on explicit user preferences first. Type of past communication with contacts may also be weighted according to the communication modality. For example, email is more formal than instant message or audio calls. So, email conversations may receive a lower weight factor. Similarly, frequently communicated contacts may be prioritized over less frequently communicated contacts. Time of day and/or day of week for the past communications may help determine priority of contacts (e.g. if a co-worker is communicated with outside work hours, that contact may be higher priority over other co-workers). Similarly, a current time of day and/or day of week for the user and the contact(s) may determine how the contacts should be ordered. Contacts, with whom past communications were strictly during work hours may be de-prioritized during off work hours for the user. User and contacts may be at different time zones. Thus, respective times may be considered in the contacts list prioritization. Another example factor that may be taken into account is application/device capabilities of the user and/or contacts. For example, if the user has currently their handheld device active without email or video capabilities, contacts with whom the user had mostly video conference or email communication may be de-prioritized.

Once a contacts list is prioritized, it may be displayed to the user (242) through their communication device or other actions 244 may be performed. Other actions 244 may include storing the contacts list(s) (246) in local or remote data stores, updating the contacts list(s) (248) by removing infrequent or unused contacts/adding new contacts, providing the user reminders (250) about infrequent contacts, changes in priority of the contacts list(s), and similar ones.

Figure 3:
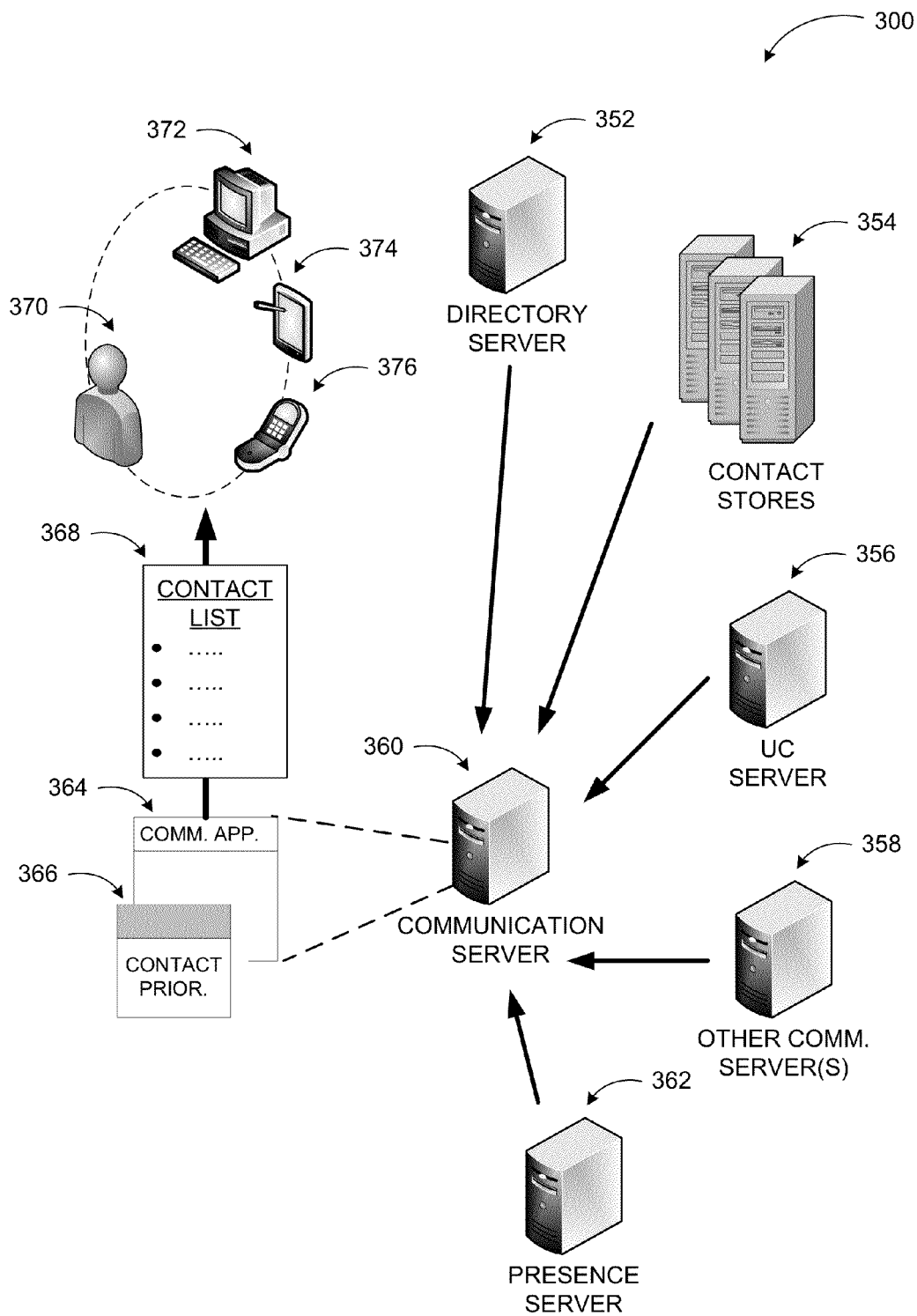
FIG. 3 is a conceptual diagram illustrating dynamic management of contacts lists based on information from different sources according to embodiments.

FIG. 3 includes conceptual diagram 300 illustrating dynamic management of contacts lists based on information from different sources according to embodiments. While a system according to embodiments is likely to include a number of servers and services such as those illustratively discussed in FIG. 1, only those relevant to embodiments are shown in FIG. 3.

User 370 may participate in various communications and collaborations through one or more applications and devices (372, 374, and 376) over a social network, an enterprise network, a private network, or similar ones. Some of those networks may be for professional use, others for personal use. The networks and communication/collaboration services may be compatible enabling exchange of data or not. User 370 may interact with other users and external contacts through a communication service 364 executed on communication server 360 in connection with one of the devices 372, 374, or 376. One of the tools of user 370 for participating in conversations is contacts list 368. The contacts list 368 provides not only contact information for select people and resources, but also allows the contacts to be grouped for ease of use, provides additional information such as presence information associated with the contacts, and the like.

Weighted factors for dynamically managing contacts list 368 may be computed by contacts list prioritization module 366 of communication service 364 based on data received from a variety of sources. For example, a number of contact data stores 354 may be available within the communication system such as a directory of all system subscribers or distinct data stores for various groups of subscribers. Directory server 352 may also be a source for contact information. Similarly, data related to past communications (type, modality, length, time, etc.) may be received from UC server 356, other communication server(s) 358, or similar sources. Presence server 362 may provide location, time, and similar information about the contacts and/or user 370.

According to some embodiments, the data from these various sources may be analyzed, grouped, and weighted factors computed for ordering contacts list 368 as discussed above. Some of the information may be a result of data mining in various data stores associated with the user. Thus, a period of data mining for determining weighted factors (e.g. in the last 6 months or any other predefined period) may be automatically determined or specified by the user 370. The rules for collecting data to compute the weighted factors may be further customizable based on attributes of the users or communication types. For example, different time periods may be defined for data mining contact stores for different subscriber levels (a manager's information may be derived from records for the past year, an assistant's information may be derived from records for the past six months, data for email communication may be collected for a longer period compared to data for voice calls, etc.).

While embodiments are described with reference to "contacts", this term should not be construed as being limited to a contacts list in context of an email or calendaring application. Contact, as used herein, refers to a broader understanding of communication partners over different networks participating in conversations employing one or more modalities.

The example systems in FIGS. 1, 2, and 3 have been described with specific components such as communication servers, directory servers, presence servers, and the like, embodiments are not limited to communication systems according to these example configurations. A multimodal communication system employing dynamic contacts list management may be implemented in configurations employing fewer or additional components and performing other tasks.

Figure 4:
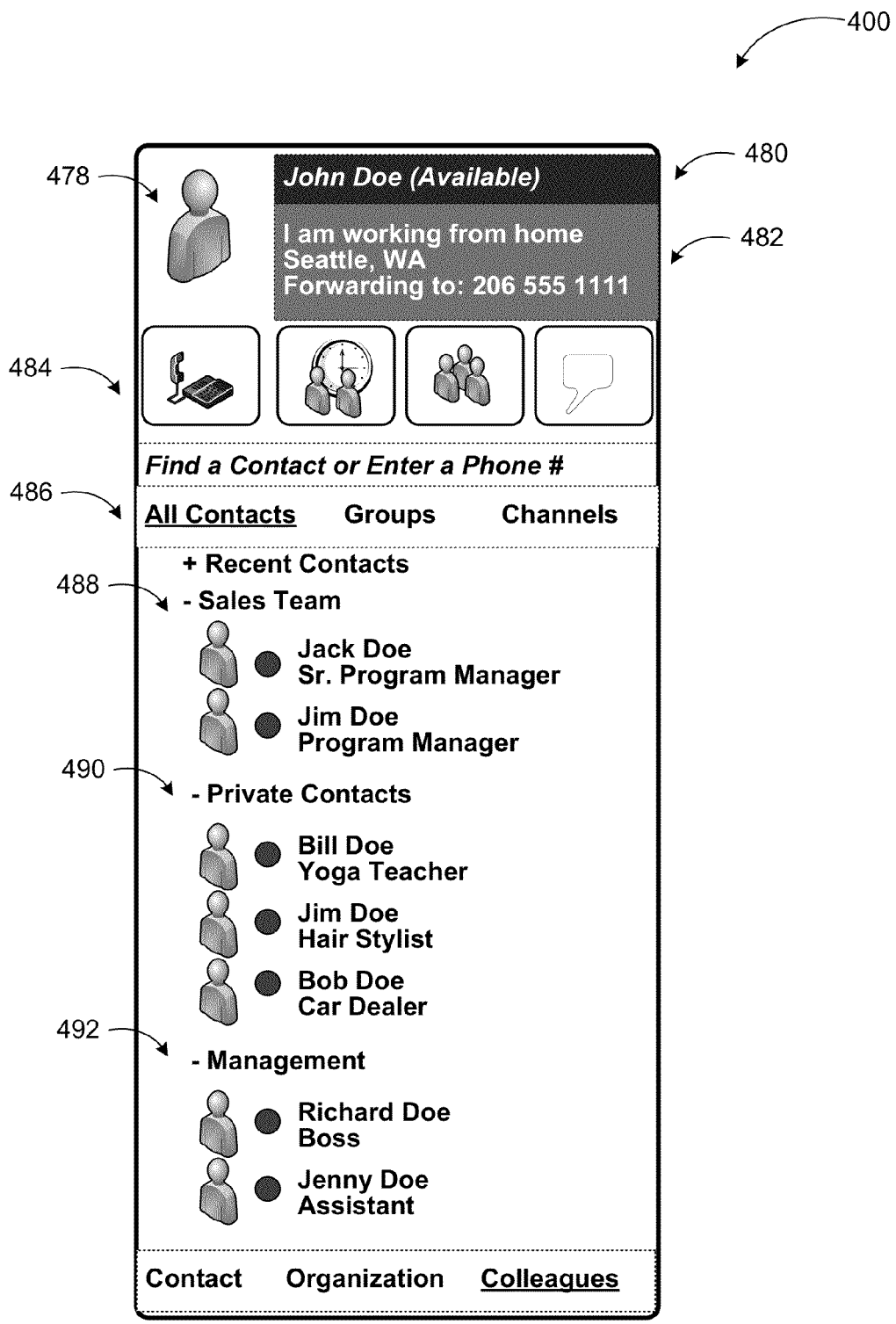
FIG. 4 is a screenshot of an example user interface for providing dynamically managed contact information to a user.

FIG. 4 is a screenshot of an example user interface for providing dynamically managed contact information to a user. Communication applications such as communication application 364 of FIG. 3 employing dynamically managed contacts lists may utilize any type of user interface, an example one with select features is shown in screenshot 400.

The user interface may include a picture (478), name and status (480), and current location (482) of the user. Graphical icons 484 for activating various communication modes (e.g. phone call, conference call, text messaging, etc.) may provide the user with alternative methods of initiating (or answering) various communication sessions. A portion of the user interface (486) may enable the subscriber to select among different options for communication such as selecting a contact from contacts list, or selecting a group.

The contacts may be presented as a single list or categorized in groups as discussed previously. Example categories illustrated in diagram 400 include recent contacts (not expanded in the figure), sales team 488, private contacts 490, and management 492. As discussed previously, prioritization of the contacts in the list and/or categorization of the contacts may be accomplished by computing weighted factors based on information associated with the user, the contacts, past communication sessions, current environment (time, location, device/application capabilities, etc.). The information for computing the weighted factors may be retrieved from a variety of sources such as those discussed in conjunction with FIGS. 2 and 3. The user and/or an administrator may be enabled to define rules for computation of the weighted factors, modify a contact's location in the list, or perform comparable actions. The contacts may be displayed in many forms including textual, graphical, and other forms of presentation, which may include additional functionality.

The above discussed scenarios, example systems, contact information, or applications are for illustration purposes. Embodiments are not restricted to those examples. Other forms of contact data, prioritization or grouping methods, and applications may be used in implementing dynamic management of contacts lists in a similar manner using the principles described herein. Furthermore, a user interface for displaying a dynamically managed contacts lists such as the one shown in FIG. 4 may include fewer or additional graphical or textual elements and functionality.

Figure 5:
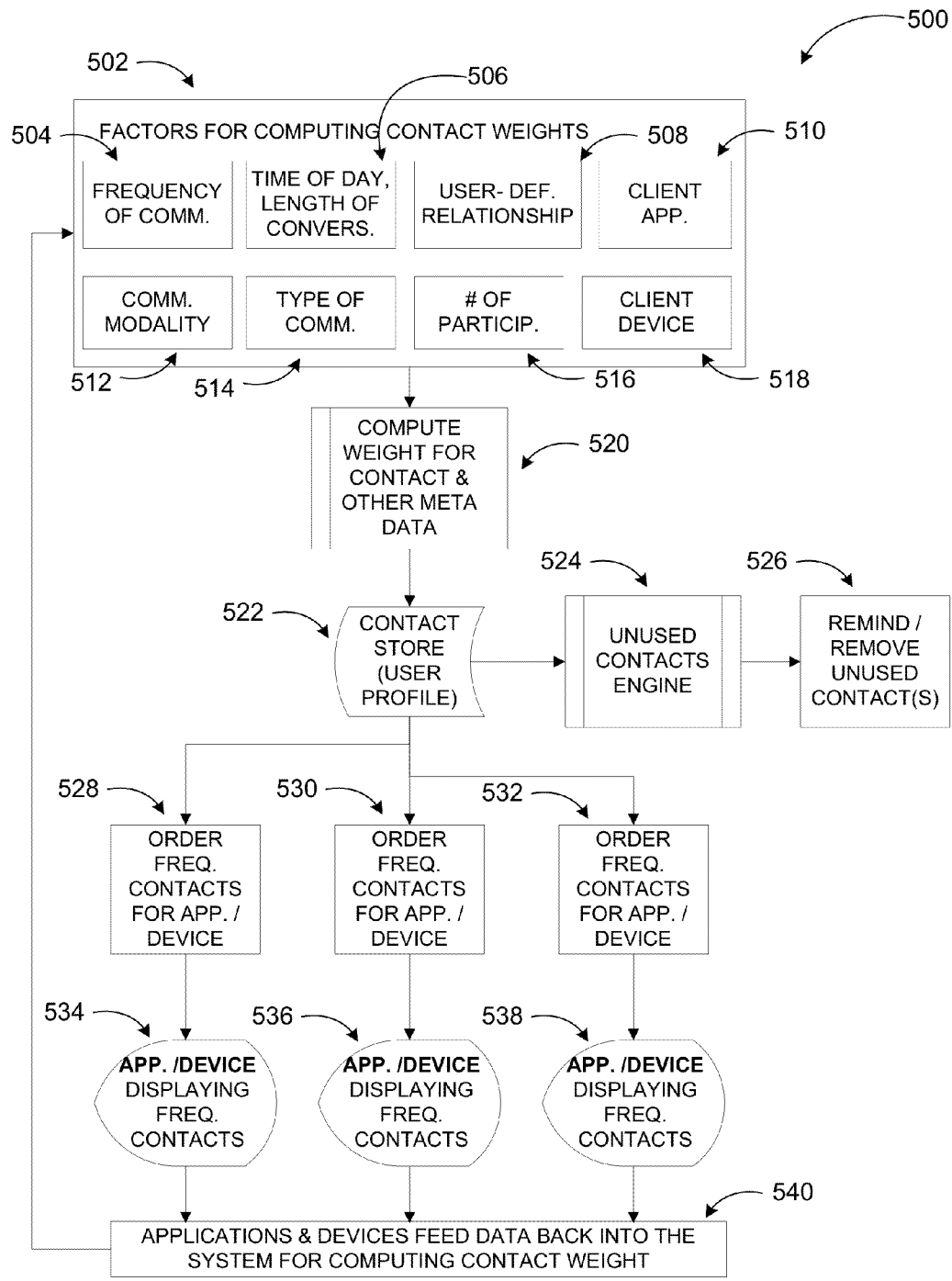
FIG. 5 is a block diagram of various components and processes in an example dynamic contact management system according to embodiments.

FIG. 5 illustrates block diagram 500 of various components and processes in an example dynamic contact management system according to embodiments.

According to some embodiments, contacts lists may be managed dynamically in various steps. First, the system may create contact objects to store user metadata, which include information about the user along with additional information for contact management such as contact weight, relationship with contact, user preferences, contact capabilities and modality used (e.g. if the user is on a phone only device, a contact with whom past communication was exclusively instant message may be dropped from the list or de-prioritized). A schema used for the contact objects may be extensible to store additional metadata if needed for the contacts.

The second step may include computation of weights for the contacts based on various factors 502. Contact weight defines the relative distance of the contact from the user. The overall weight for a contact may be computed based on various weighted factors 502. Example factors include: frequency of communication 504 with the contact (e.g. a contact with whom the user communicates three times a day may have higher weight compared to another contact that is called or emailed once a day); type of communication 514 such as incoming, outgoing, group communication, etc. (e.g. a communication started by the user to the contact may carry higher weight than a communication initiated by the contact or a group communication); modality of communication 512 such as email, instant message, phone, etc. (e.g. a user may be using instant message for a majority of contacts but phone only for personal contacts); time of day/day of week and duration (e.g. communication after work hours or longer conversations may define a higher weight for a contact).

Other factors may include time of day (or day of week) 506, user defined relationships 508, number of participants in group communications 516, client application types and capabilities 510 for the user and the contacts, client device types and capabilities 518 for the user and the contacts. A system according to embodiments may also employ an aging algorithm to decrement the weight for contacts that are not frequently contacted. This in return may de-prioritize the contact in the list.

Next, a contacts list cache may be created to compute the dynamic contacts list (520). The system may create a cache of a number of contacts with whom the user communicated in the past. The cache may also include contacts that have been explicitly added by the user to the contacts list. The cache may be shared by multiple devices and applications (534, 536, and 538) associated with the user such as email applications, communication applications, social networking applications, collaboration applications, desktop devices, handheld devices, smart phones, and similar ones.

According to some embodiments, the contacts list cache may be stored in a roaming profile for the user allowing access from multiple devices and end points. The contacts list with weights and other contact attributes may also be maintained in a unified contact store 522 associated with user profile. This store may be associated with a particular communication/collaboration service or some other centralized database. Any application or device with access to this central store may pull the list of frequent contacts.

Another step in dynamically managing contacts lists is displaying the list(s) through a communication/collaboration application. The application may call into the centralized list to get the frequent contacts that are relevant for modalities supported by the application and/or device. For example, if the application allows only instant message and phone conversations and no email, it may pull the contact list for frequent contacts that have a SIP URI or Tel URI for supporting instant message and phone conversations, respectively. Another example may be a phone application that pulls the list of frequent contacts with the capability to facilitate voice communication.

Since the data is stored for a contact object, the correlation of different signaling mechanisms is enabled in one single place and an application may filter the contact data to display, based on the supported signaling protocol. Moreover, if the list of frequent contacts is stored in a centralized location, it provides easy access to all applications. The rendering of the frequent contacts may be customized for different applications (528, 523, and 532). According to other embodiments, the applications may be provided access to an interface to edit/compute the weights for contacts and update them into the centralized user profile.

As discussed above a user may be enabled to provide input for customization of the dynamic contacts list. A system according to some embodiments may provide the user with options to control the dynamic contacts list. The user may define his/her preferences that may be used by system to define the contacts list. Such options may include, but are not limited to, preferences based on application, device, time of day, relationship, location, and the like. Moreover, the applications and devices rendering the customized contacts lists may provide further feedback to the system for dynamically computing contact weights (540).

According to further embodiments, the dynamics management of the contacts lists may include removal of old or unused contacts from the lists. An aging algorithm may be employed at an unused contacts engine 524 to decrement the weight of contacts that have not been contacted frequently. Since the system contains the knowledge of various metadata related to the contacts, it may suggest to the user removal of such contacts from the contacts list or remind the user to contact (526) them helping in overall contact management. The contact list clean-up may be specific to devices or applications. For example, a contact may be part of the unified contact store associated with a user profile but the user may not want to display that contact any more in his/her contacts list for an instant messaging application.

Figure 6:
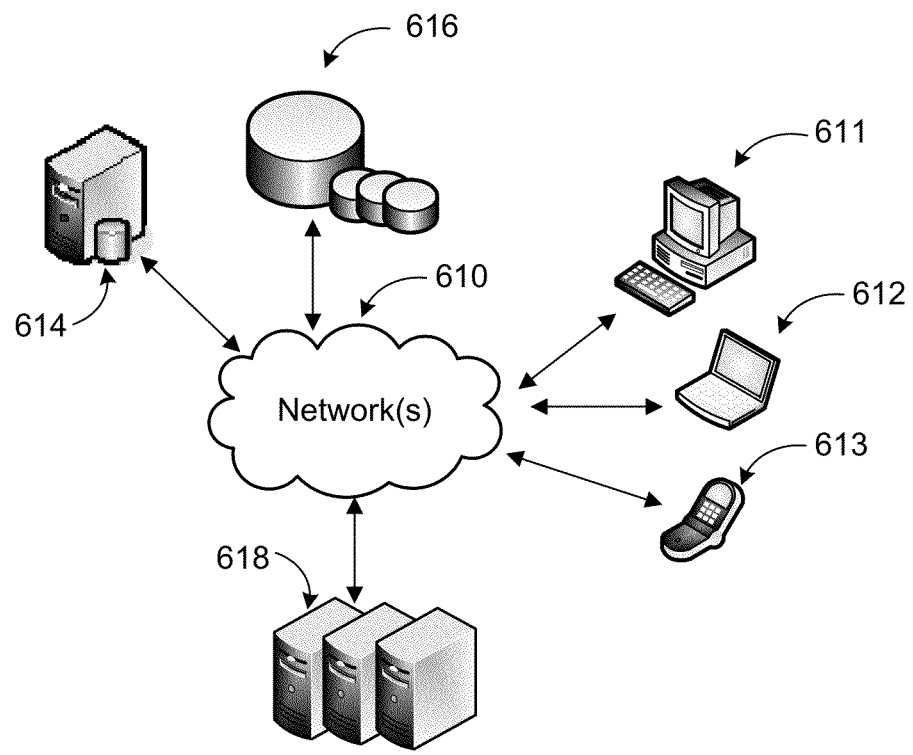
FIG. 6 is a networked environment, where a system according to embodiments may be implemented.

FIG. 6 is an example networked environment, where embodiments may be implemented. A platform providing dynamic contact management in communication systems may be implemented via software executed over one or more servers 618 such as a hosted service. The platform may communicate with client applications on individual computing devices such as a server 613 or a laptop computer 612 and desktop computer 611 ('client devices') through network(s) 610.

As discussed above, a contact prioritization module in association with a communication application or service may be used to manage contacts lists prioritizing contacts based on weighted factors and other metadata, as well as modifying the lists based on similar factors. A communication service or application executed on servers 618 or single server 614 may receive input from users through client devices 611, 612 or 613, retrieve contact/user/communication data from data store(s) 616, and provide prioritized contacts lists to user(s). In other embodiments, the prioritized contacts lists may be transmitted (e.g. through email), printed, or stored based on user request.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a communication system with dynamically managed contacts lists. Furthermore, the networked environments discussed in FIG. 6 are for illustration purposes only. Embodiments are not limited to the example applications, modules, or processes.

Figure 7:
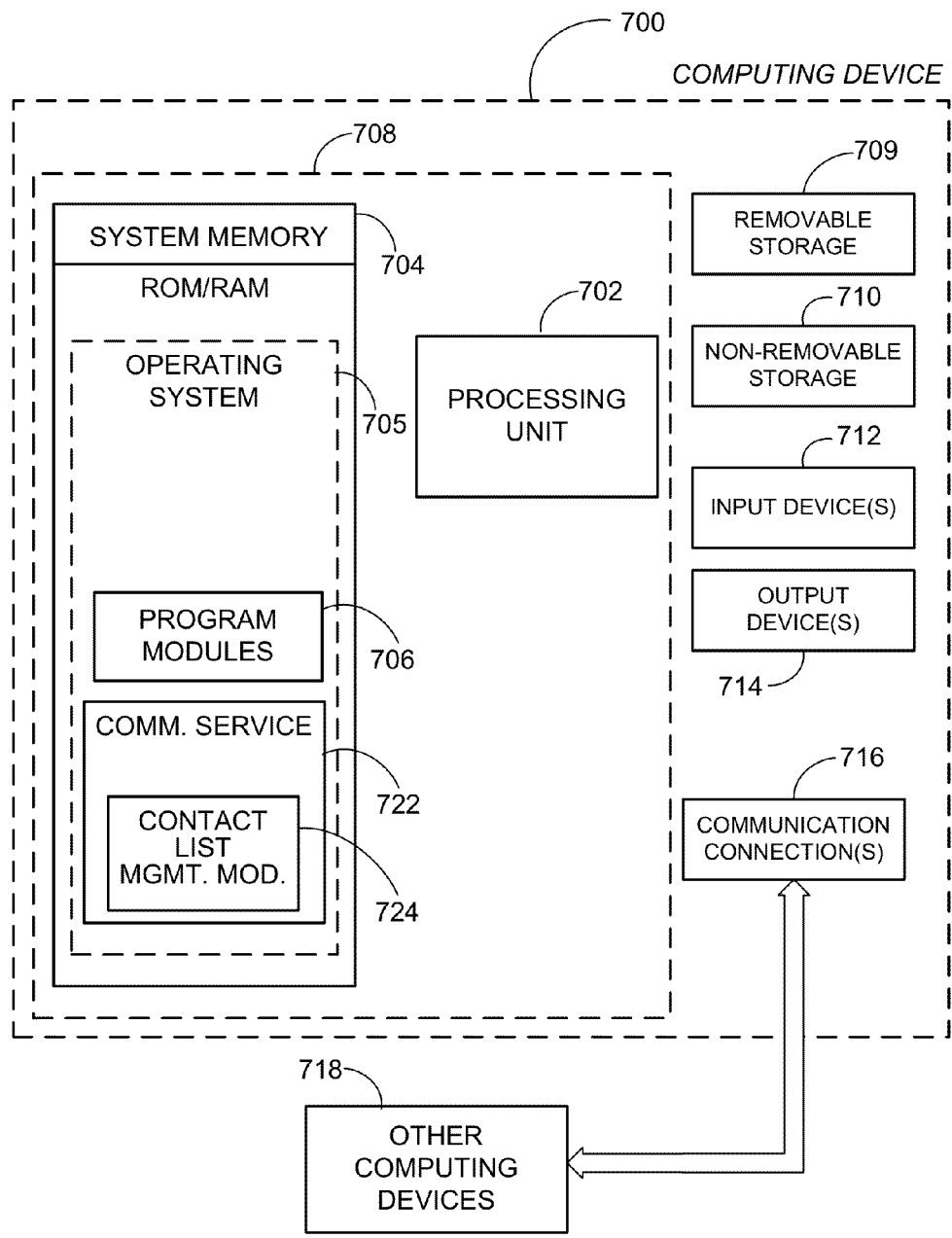
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server managing a communication application or service and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, communication service 722, and contact list management module 724.

Communication service 722 may be any application that facilitates communication between client applications and servers relevant to an enhanced communication system. Contact list management module 724 may receive contact information, user profile, communication information, and similar data, weight predefined factors, and prioritize contacts lists to be provided to users as discussed previously. The contacts lists may be dynamically updated based on information received from various sources. Contact list management module 724 and application 722 may be separate applications or integral modules of a hosted service that provides enhanced communication services to client applications/devices. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
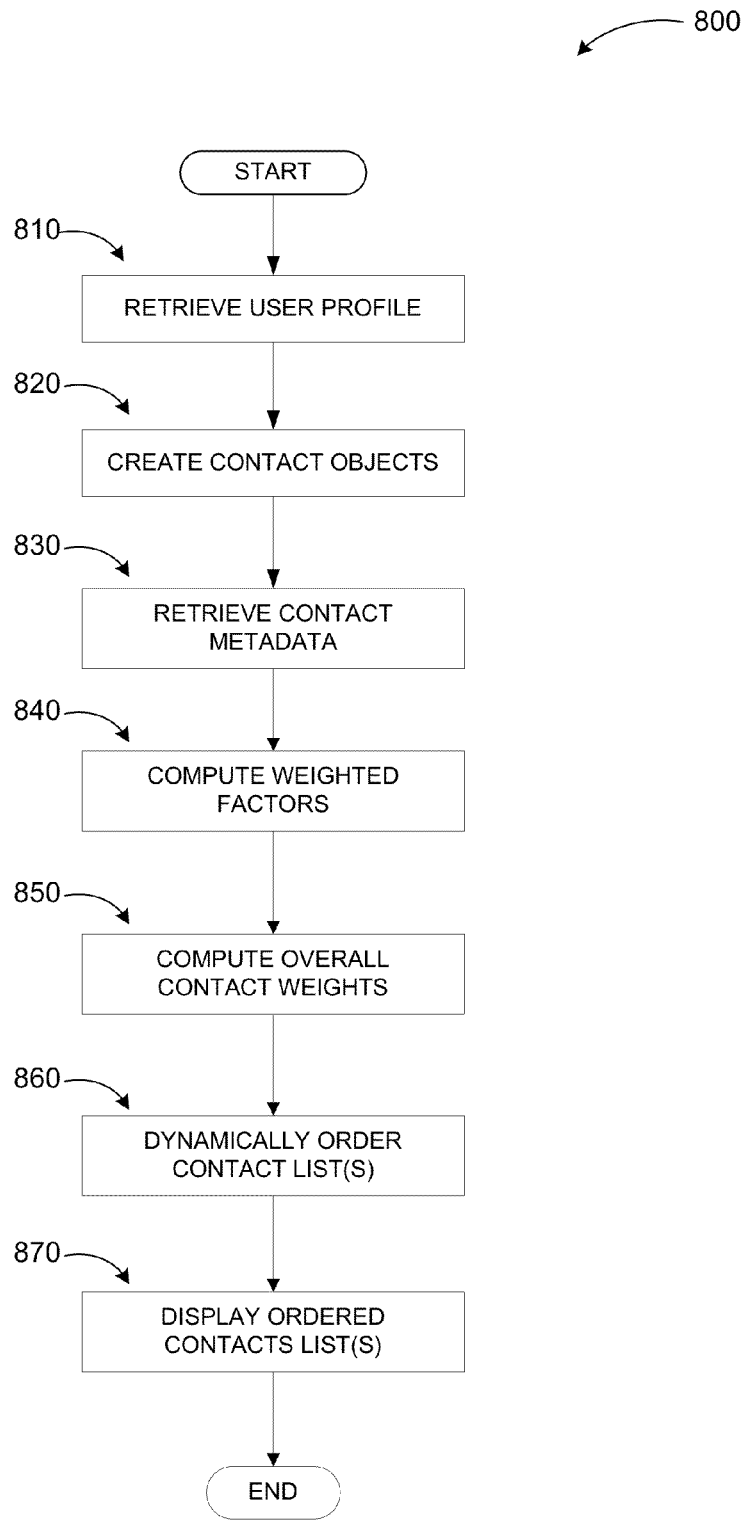
FIG. 8 illustrates a logic flow diagram for a process of dynamically managing contacts lists according to embodiments.

FIG. 8 illustrates a logic flow diagram for process 800 of dynamically managing contacts lists according to embodiments. Process 800 may be implemented as part of an enhanced communication system.

Process 800 begins with operation 810, where user profile is retrieved. The user profile may include information associated with user's communication/collaboration application, device, current time of day, location, preferences, and similar parameters. At operation 820, contact objects may be created for storing about the contacts (and the user). This may be followed by operation 830, where contact metadata is retrieved. Contact metadata may be retrieved from a variety of resources as discussed previously and include contact communication/collaboration application, device, contact's time of day, contact's location, past communication patterns with the contacts, and similar parameters.

At process 840, weighted factors are computed for each contact based on the retrieved metadata and system defined and/or user customized rules. The weighted factors may be used to compute an overall weight for each contact at operation 850, which is used to order the contacts list at operation 860. The contacts list may be customized for each application/device associated with the user based on the above mentioned factors. The prioritized contacts list may be displayed to the user at operation 870. Other actions such as removing unused contacts, reminding the user about unused contacts, etc. may also be performed based on the computations at operations 840 and 850.

The operations included in process 800 are for illustration purposes. Dynamic contacts list management based on weighted factors from various resources may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for dynamically managing contacts lists information in a multimodal communication system, the method comprising:
    determining a user's profile at processor of the computing device;
    determining contact information associated with contacts in a contacts list for the user, the contact information including a current time of day for the contacts, a current day of week for the contacts, a current location of the contacts, application capabilities for the contacts, and past communication patterns with the contacts at the processor of the computing device in conjunction with at least one of a directory server, a uniform communication server, a communication server, and a presence server, wherein the past communication patterns include available one of: a modality of each past communication session, a modality of future activities scheduled in the past, a number of participants in each past communication session, and an initiator of each past communication session;
    computing weighted factors for each of the contacts based on the contact information at the processor;
    computing an overall weight for each contact based on the weighted factors associated with each contact at the processor;
    ordering the contacts list based on the overall weight of each contact in the contacts list at the processor;
    presenting the ordered contacts list to the user through a display of a device associated with the user;
    updating the weighted factors in response to changes to the contact information at the processor and based on feedback from a plurality of devices associated with the user for rendering the contacts list based on one or more capability of each device and corresponding capabilities of contacts in the contacts list;
    dynamically re-ordering the contacts list based on the updated weighted factors at the processor;
    customizing and reordering the contacts list for each of a plurality of devices associated with the user rendering the contacts list based on one or more capability of each device at the processor and corresponding capabilities of contacts in the contacts list; and
    making the contact list available, through a communication module of the communication server, in a unified contact store to a communication application associated with the user, wherein the contact list is reordered based on a capability of the communication application.

2. The method of claim 1, wherein the user's profile includes information associated with at least one from a set of: relationships explicitly defined by the user, current time of day for the user, current day of week for the user, current location of the user, application capabilities for the user, device capabilities for the user, and explicit user preferences.

3. The method of claim 1, wherein the contact information further includes relationships explicitly defined by the contacts and device capabilities for the contacts.

4. The method of claim 1, wherein the modality of the past communication sessions and future activities scheduled in the past includes one of: a voice communication, a video communication, an email conversation, an instant message conversation, a data collaboration session, an application sharing session, a whiteboard sharing session, a multimodal conversation, and a multimodal conference.

5. The method of claim 1, wherein the initiator of the past communication sessions includes one of: the user, the contact, and a third party.

6. The method of claim 1, further comprising:
    determining additional information associated with the multimodal communication system for computing the weighted factors, wherein the additional information includes at least one of: a network condition and an administrative rule.

7. The method of claim 1, further comprising:
    filtering the contact list based on a signaling protocol supported by a communication application of each contact and the user.

8. The method of claim 1, further comprising:
    categorizing contacts on the contacts list based on the weighted factors.

9. The method of claim 1, further comprising:
    determining infrequently communicated contacts based on the weighted factors; and
    providing the user a reminder about the infrequently communicated contacts.

10. The method of claim 9, further comprising:
    automatically removing the infrequently communicated contacts from the contacts list.

11. A communication server for dynamically managing contacts lists in a multimodal communication system, the server comprising:
- a memory configured to store instructions; and
- a processor configured to:
  - determine a user's profile;
  - determine contact information associated with contacts in a contacts list for the user, the contact information including a current time of day for the contacts, a current day of week for the contacts, a current location of the contacts, application capabilities for the contacts, and past communication patterns with the contacts, wherein the past communication patterns include available one of: a modality of each past communication session, a modality of future activities scheduled in the past, a number of participants in each past communication session, and an initiator of each past communication session;
  - compute weighted factors for each of the contacts based on the contact information;
  - compute an overall weight for each contact based on the weighted factors associated with each contact;
  - order the contacts list based on the overall weight of each contact in the contacts list;
  - make the contact list available, through a communication module of the communication server, in a unified contact store to a communication application associated with the user, wherein the contact list is reordered based on a capability of the communication application;
  - update the weighted factors in response to changes to the contact information;
  - update the weighted factors further based on feedback from a plurality of devices associated with the user for rendering the contacts list based on one or more capability of each device and corresponding capabilities of contacts in the contacts list; and
  - dynamically re-order the contacts list based on the updated weighted factors.

12. The system of claim 11, wherein the server is further configured to create a contact object with an extensible schema for each contact for storing weighted factors associated with each contact.

13. The system of claim 11, wherein the server maintains a contacts list cache for computing the overall weight for each of the contacts, the cache being shared by the plurality of applications and devices associated with the user.

14. The system of claim 13, wherein the plurality of applications and devices associated with the user are provided a user interface to modify the computation of the weighted factors and the overall weights of the contacts.

15. The system of claim 11, wherein the contacts list is customized and reordered for each of the plurality of applications and devices rendering the contacts list.

16. A computing device for dynamically managing contacts list information in a communication system, the computing device comprising:
- a memory storing instructions; and
- a processor coupled to the memory, the processor configured to execute a method in conjunction with the instructions, the method comprising:
  - determining a user's profile;
  - determining contact information associated with contacts in a contacts list for the user, the contact information including a current time of day for the contacts, a current day of week for the contacts, a current location of the contacts, and application capabilities for the contacts;
  - determining additional information associated with past communication sessions between the user and the contacts, the additional information including a frequency of communication, a duration of each past communication session, a time of day for each past communication session, a day of week for each past communication session, a modality of each past communication session, a modality of future activities scheduled in the past, a number of participants in each past communication session, and an initiator of each past communication session;
  - computing weighted factors for each of the contacts based on the user's profile, the contact information, and the additional information;
  - computing an overall weight for each contact based on the weighted factors associated with each contact;
  - dynamically maintaining the weighted factors and the overall weight for each contact in contact objects according to an extensible schema;
  - ordering the contacts list using the contact objects;
  - customizing and reordering the contacts list for each of a plurality of devices associated with the user rendering the contacts list based on one or more capability of each device at the processor and corresponding capabilities of contacts in the contacts list;
  - presenting the ordered contacts list to the user through a communication module of the computing device, in a unified contact store to a communication application associated with the user, wherein the contact list is reordered based on a capability of the communication application;
  - updating the weighted factors in response to changes to the user's profile, the contact information, the additional information, and based on feedback from the plurality of devices associated with the user for rendering the contact list based on one or more capability of each device and corresponding capabilities of contacts in the contacts list; and
  - dynamically re-ordering the contacts list based on the updated weighted factors.

17. The computing device of claim 16, wherein the method further comprises:
- determining the user's profile, the contact information, and the additional information includes retrieving data from a plurality of communication and collaboration applications associated with the user.

18. The computing device of claim 17, wherein plurality of communication and collaboration applications are associated with at least one from a set of: an enterprise communication system, a social networking system, and a private communication system.

19. The computing device of claim 16, wherein the method further comprises performing one of:
- adding a new contact, removing an infrequently communicated contact, and providing the user a reminder about an infrequently communicated contact based on the user's profile, the contact information, and the additional information.

* * * * *